（12）United States Patent
Fan

(10) Patent No.: US 12,259,303 B2
(45) Date of Patent: Mar. 25, 2025

(54) BLADE LOAD MECHANISM, BLADE UNLOAD MECHANISM AND BLADE CHANGING SYSTEM

(71) Applicant: Leica Biosystems Nussloch GmbH, Nussloch (DE)

(72) Inventor: Zheguang Fan, Shanghai (CN)

(73) Assignee: Leica Biosystems Nussloch GmbH, Nussloch (DE)

( * ) Notice: Subject to any disclaimer, the term of this patent is extended or adjusted under 35 U.S.C. 154(b) by 286 days.

(21) Appl. No.: 17/775,058

(22) PCT Filed: Nov. 7, 2019

(86) PCT No.: PCT/CN2019/116279
§ 371 (c)(1),
(2) Date: May 6, 2022

(87) PCT Pub. No.: WO2021/087869
PCT Pub. Date: May 14, 2021

(65) Prior Publication Data
US 2022/0390331 A1 Dec. 8, 2022

(51) Int. Cl.
*G01N 1/06* (2006.01)
*B26D 7/26* (2006.01)

(52) U.S. Cl.
CPC ............... *G01N 1/06* (2013.01); *B26D 7/26* (2013.01); *G01N 2001/061* (2013.01)

(58) Field of Classification Search
CPC ....... G01N 1/06; G01N 2001/061; B26D 7/26
(Continued)

(56) References Cited

U.S. PATENT DOCUMENTS 5,092,210 A 3/1992 Dern
5,669,278 A * 9/1997 Metzner ................... G01N 1/06
83/699.61
(Continued)

FOREIGN PATENT DOCUMENTS

CN 202648991 1/2013
CN 103568064 2/2014
(Continued)

OTHER PUBLICATIONS

WIPO, International Search Report and Written Opinion for International Application No. PCT/CN2019/116279, Sep. 17, 2020.
(Continued)

*Primary Examiner* — Omar Flores Sanchez
(74) *Attorney, Agent, or Firm* — Kinney & Lange, P.A.

(57) ABSTRACT

The present disclosure provides a blade load mechanism for a blade holder of a microtome. The blade holder has a base defining a blade receptacle configured to receive a blade, the blade load mechanism includes a blade supply container configured to contain a blade therein, the blade supply container defining a removal opening through which the blade is able to be removed from the blade supply container, and a blade access slot through an outer wall of the blade supply container in a length direction of the blade; and a blade pusher configured to engage with the blade through the blade access slot and slide along the blade access slot to push the blade out of the blade supply container through the removal opening, and deliver the blade into the blade receptacle. The present disclosure further provides a blade unload mechanism and a blade changing system.

19 Claims, 3 Drawing Sheets

(58) Field of Classification Search
USPC .......................................................... 83/703
See application file for complete search history.

(56) References Cited

U.S. PATENT DOCUMENTS

| | | | |
|---|---|---|---|
| 5,964,138 A | 10/1999 | Metzner et al. | |
| 9,033,184 B2 | 5/2015 | Walter | |
| 9,304,064 B2 * | 4/2016 | Walter | B23Q 3/155 |
| 10,488,303 B2 * | 11/2019 | Miyatani | B23Q 3/1556 |
| 2002/0005104 A1 * | 1/2002 | Hendrick | B26D 7/2614 |
| | | | 83/915.5 |
| 2006/0262467 A1 | 11/2006 | Wilk et al. | |
| 2006/0272467 A1 | 12/2006 | Hendrick et al. | |
| 2008/0148918 A1 | 6/2008 | Thiem et al. | |
| 2008/0202308 A1 * | 8/2008 | Fujiwara | G01N 1/06 |
| | | | 83/703 |
| 2014/0033888 A1 | 2/2014 | Walter | |
| 2021/0162618 A1 * | 6/2021 | Sugiyama | B26D 7/22 |
| 2022/0404237 A1 * | 12/2022 | Fan | G01N 1/06 |
| 2023/0321859 A1 * | 10/2023 | Chen | B26D 7/2614 |
| | | | 83/13 |

FOREIGN PATENT DOCUMENTS

| | | | |
|---|---|---|---|
| CN | 203432814 | 2/2014 | |
| CN | 205317510 U | 6/2016 | |
| JP | 2003532109 A | 10/2003 | |
| JP | 2010054481 A | 3/2010 | |
| JP | 2010054483 A | 3/2010 | |
| JP | 2010249724 A | 11/2010 | |
| JP | 2014032198 A | 2/2014 | |
| JP | 2017187409 A | 10/2017 | |
| WO | WO-2021081793 A1 * | 5/2021 | ............... B26D 5/00 |

OTHER PUBLICATIONS

Extended European Search Report for European Patent Application No. 19951393.8, dated Jan. 12, 2024, 13 pages.
First Chinese Office Action for Chinese Patent Application No. 201980100760.0, dated Apr. 28, 2023, 14 pages.
Notice of Allowance for Chinese Patent Application No. 201980100760.0, dated Jan. 2, 2024, 5 pages.
Notice of Reasons for Refusal for Japanese Patent Application No. 2022-526344, dated Jun. 5, 2023, 14 pages.
Partial European Search Report for European Patent Application No. 19951393.8, dated Sep. 29, 2023, 15 pages.

* cited by examiner

BLADE LOAD MECHANISM, BLADE UNLOAD MECHANISM AND BLADE CHANGING SYSTEM

CROSS-REFERENCE TO RELATED APPLICATION

This application is a U.S. national stage entry of International Application No. PCT/CN2019/116279, filed Nov. 7, 2019, the entire disclosure of which is incorporated herein by reference.

FIELD

The present disclosure relates to a technical field of microtomes, and more particularly to a blade load mechanism, a blade unload mechanism and a blade changing system.

BACKGROUND

In a microtome of a related art, a disposable blade clamped in a blade holder is used to section specimens, and after sectioning several specimens, the blade needs to be changed because it becomes dull.

Generally, when the blade becomes dull, a user operates the blade holder to release the blade, then pushes the blade out of the blade holder by one hand, and holds the blade and inserts the blade into a blade disposal box by the other hand. Next, the user pushes a new blade out of a blade supply box by one hand, and holds the blade and inserts it into the blade holder by the other hand. Then, the user operates the blade holder to clamp the blade for sectioning of the specimens.

Therefore, this blade changing process is laborious, time-consuming and dangerous for the user.

SUMMARY

Embodiments of the present disclosure seek to solve at least one of the problems existing in the related art to at least some extent.

Embodiments of a first aspect of the present disclosure provide a blade load mechanism for a blade holder of a microtome. The blade holder has a base defining a blade receptacle configured to receive a blade, and the blade load mechanism includes a blade supply container and a blade pusher. The blade supply container is configured to contain a blade therein, the blade supply container defines a removal opening through which the blade is able to be removed from the blade supply container, and a blade access slot through an outer wall of the blade supply container in a length direction of the blade. The blade pusher is configured to engage with the blade through the blade access slot and slide along the blade access slot to push the blade out of the blade supply container through the removal opening, and deliver the blade into the blade receptacle of the base of the blade holder.

In some embodiments, the blade load mechanism further includes a first bracket; a first guide rail fixedly connected to the first bracket; and a first slide block slidable along the first guide rail, in which the blade pusher is fixedly connected to the first slide block, such that the first slide block is able to be driven to slide along the first guide rail to drive the blade pusher to slide in the blade access slot.

In some embodiments, one of the first guide rail and the first slide block is provided with a first dovetail slot, and the other of the first guide rail and the first slide block is provided with a first flange mating with the first dovetail slot.

In some embodiments, an extending direction of the first guide rail is parallel to an extending direction of the blade access slot.

In some embodiments, the blade load mechanism further includes a first electric motor having an output shaft and provided at one of the first slide block and the first bracket; a first gear providing at an end of the output shaft; and a first rack provided at the other of the first slide block and the first bracket and capable of meshing with the first rack.

In some embodiments, the first guide rail and the first bracket are formed into one piece.

In some embodiments, the blade pusher is provided with a protrusion, and the blade defines a recess, the protrusion of the blade pusher is able to be fitted in the recess of the blade.

In some embodiments, the recess is defined at two ends of the blade in the length direction of the blade.

In some embodiments, the first bracket comprises a first plate and a second plate, the first plate is perpendicularly connected to a first end of the second plate, the first guide rail and the first gear are fixedly connected to the two opposite sides of the first plate, and the first guide rail is arranged away from the second plate; the first rack is fixedly connected to a first side of the second plate, the blade supply container is detachably connected to a second side of the second plate opposite the first side of the second plate.

In some embodiments, the first bracket further comprises a third plate, the third plate is perpendicularly connected to a second end of the second plate opposite the first end of the second plate, the third plate and the first plate are located at two opposite sides of the second plate, the blade supply container is detachably connected to the second plate and the third plate.

In some embodiments, the blade load mechanism further includes a first connecting member including a second connecting plate, a second connecting plate and a third connecting plate, in which the second connecting plate and the third connecting plate are perpendicularly connected to two ends of the second connecting plate, parallel to each other and located at the same side of the second connecting plate, the second connecting plate is fixedly connected to the first slide block, and the first electric motor is fixedly connected to the a side of the third plate away from the first plate.

In some embodiments, the third connecting plate has a low level than that of the first rack, the first output shaft of the first electric motor passes through the third connecting plate and extends into a space between the first plate and the third plate, and the first gear provided at the output end meshes with the first rack.

Embodiments of a second aspect of the present disclosure provide a blade unload mechanism for a blade holder of a microtome. The blade holder may has a base defining a blade receptacle configured to receive a blade, and the blade unload mechanism includes a blade attractor and a blade disposal container. The blade attractor is configured to operatively attract an end of the blade received in the blade receptacle of the blade holder; and the blade disposal container defines an receiving opening at a top of the blade disposal container, in which the blade attractor is arranged above the blade disposal container and configured to be able to move in an extending direction of the receiving opening under the action of a driving force so as to pull the blade out of the blade receptacle of the blade holder, and the blade disposal container is configured to receive the removed blade through the receiving opening.

In some embodiments, the blade unload mechanism further includes a second bracket; a second guide rail fixedly connected to the second bracket, and a second slide block slidable along the second guide rail, in which the blade attractor is fixedly connected to the second slide block, and the second slide block is configured to be driven to slide along the second guide rail to drive the blade attractor to move in the extending direction of the receiving opening.

In some embodiments, one of the second guide rail and the second slide block is provided with a second dovetail slot, and the other of the second guide rail and the second slide block is provided with a second flange mating with the second dovetail slot.

In some embodiments, an extending direction of the second guide rail is parallel to an extending direction of the receiving opening of the blade disposal container.

In some embodiments, the blade unload mechanism further includes a second electric motor having an output shaft and provided at one of the second slide block and the second bracket; a second gear providing at an end of the output shaft; and a second rack provided at the other of the second slide block and the second bracket and capable of meshing with the second rack.

In some embodiments, the blade attractor is provided with an electronic magnet. The electronic magnet may be configured to attract and hold the blade on the blade attractor when the electronic magnet is energized.

In some embodiments, the second slide block has a stroke in the extending direction of the receiving opening of the blade disposal container greater than or equal to the length of the blade.

Embodiments of a third aspect of the present disclosure provide a blade changing system for a microtome. The blade changing system includes a blade holder having a base defining a blade receptacle configured to receive a blade; a blade load mechanism according to any one of the above embodiments; and a blade unload mechanism according to any one of the above embodiments, in which the blade load mechanism and the blade unload mechanism are provided at two opposite sides of the blade holder in an extending direction of the blade receptacle, the blade load mechanism is configured to load a blade into the blade receptacle of the base of the blade holder, and the blade unload mechanism is configured to unload a blade from the blade receptacle of the base of the blade holder.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
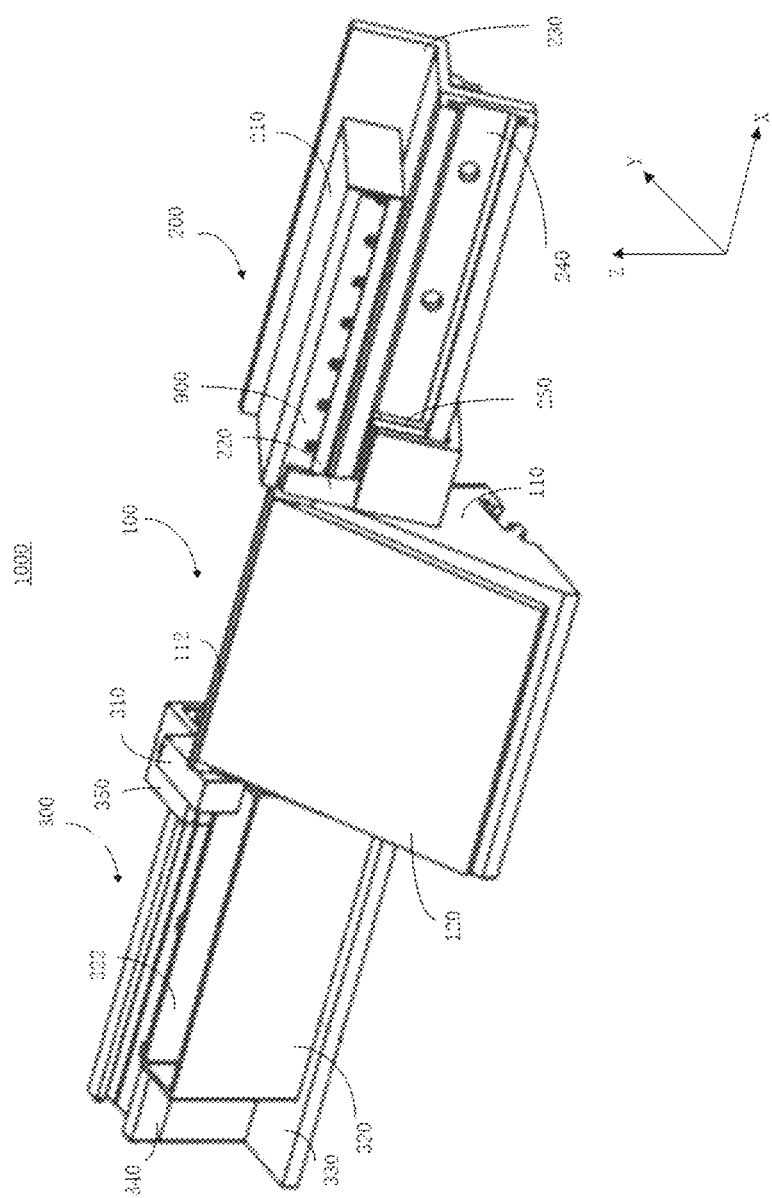
FIG. 1 is a perspective view of a blade changing system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

A blade changing system 1000 for a microtome according to embodiments of the present disclosure will be describe in detail below with reference to FIGS. 1-3. The blade changing system 1000 may include a blade holder 100, a blade load mechanism 200, and a blade unload mechanism 300.

It should note that, the orthogonal XYZ-axis and X'Y'Z' are illustrated in order to facilitate the description and determine the directions. In which, the positive direction of the X-axis is the right direction and the negative direction of the X-axis is the left direction with respect to the blade holder or the blade unload mechanism; the positive direction of the Y-axis is the rear direction and the negative direction of the Y-axis is the front direction with respect to the blade holder or the blade unload mechanism; the positive direction of the Z-axis is the up direction and the negative direction of the Z-axis down direction with respect to the blade holder or the blade unload mechanism. The positive direction of the X'-axis is the right direction and the negative direction of the X'-axis is the left direction with respect to the blade load mechanism; the positive direction of the Y'-axis is the rear direction and the negative direction of the Y'-axis is the front direction with respect to the blade load mechanism; the positive direction of the Z'-axis is the up direction and the negative direction of the Z'-axis down direction with respect to the blade load mechanism.

As illustrated in FIG. 1, the blade holder 100 may have a base 110 defining a blade receptacle 112 configured to receive a blade 900, and a pressure plate 120 configured to releasably clamp the blade 900 received in the blade receptacle 112 on the base 110. Thus, the blade 900 can be tightly clamped when it is used to section a specimen, and the blade 900 can be released for replacement when the blade 900 becomes dull after sectioning several specimens.

In some embodiments, as illustrated in FIG. 1, the blade load mechanism 200 and the blade unload mechanism 300 may be provided at two opposite sides of the base 110 of the blade holder 100 in an extending direction the blade receptacle 112 of the base 110. The blade load mechanism 200 may be configured to load a blade 900 into the blade receptacle 112 of the base 110 of the blade holder 100, and the blade unload mechanism 300 may be configured to unload a blade 900 from the blade receptacle 112 of the base 110 of the blade holder 100.

Figure 2:
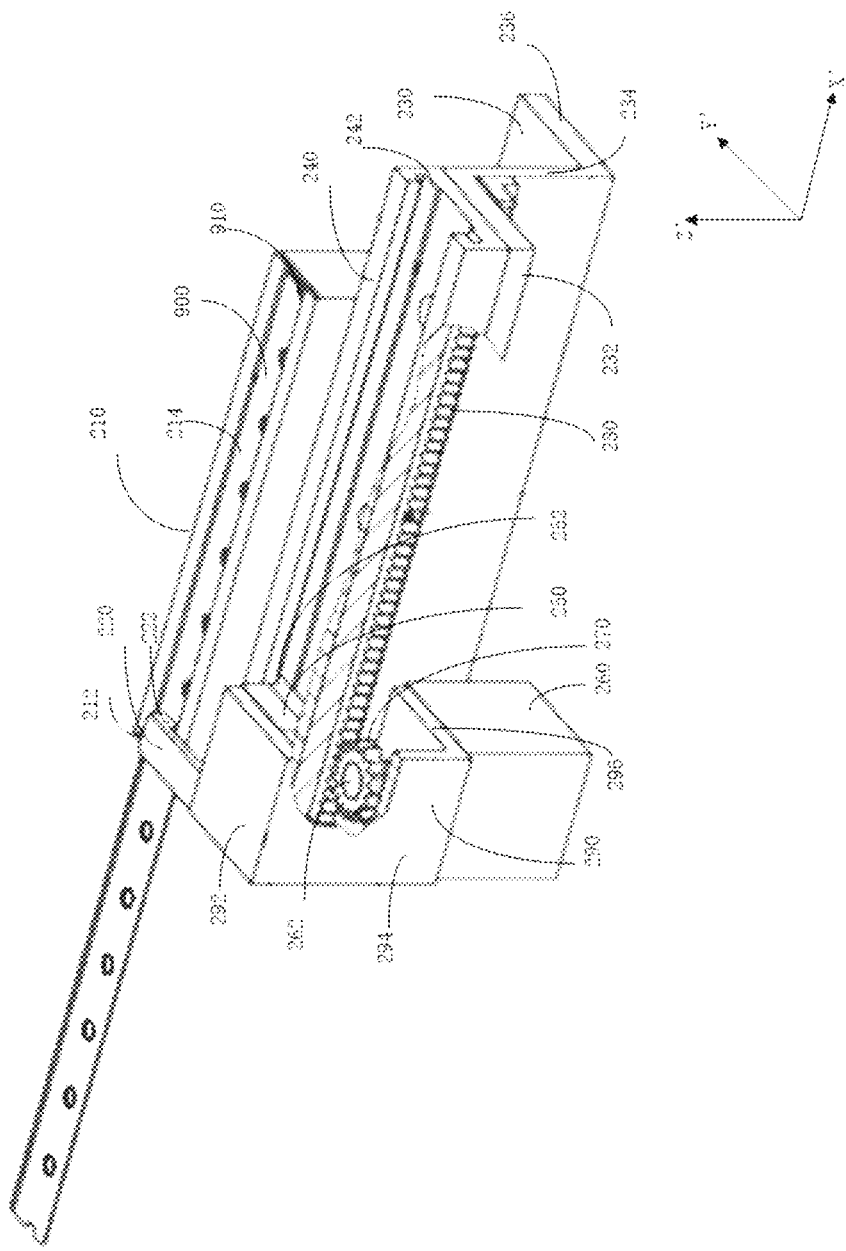
FIG. 2 is a perspective view of a blade load mechanism according to an embodiment of the present disclosure.

According to embodiments of the present disclosure, as illustrated in FIGS. 1 and 2, the blade load mechanism 200 may include a blade supply container 210, and a blade pusher 220. The blade supply container 210 may contain a blade 900 therein, and define a removal opening 212 through which the blade 900 is able to be removed from the blade supply container 210, and a blade access slot 214 extending through an outer wall of the blade supply container 210 in a length direction of the blade 900 and through which the blade pusher 220 is able to engage with the blade 900. The blade pusher 220 may be configured to slide along the blade access slot 214 to push the blade 900 out of the blade supply container 210 through the removal opening 212, and deliver the blade 900 into the blade receptacle 112 of the base 110 of the blade holder 100, thereby achieving loading of the blade 900.

In the blade load mechanism 200 according to embodiments of the present disclosure, by providing the blade supply container 210 and the blade pusher 220, the blade 900 contained in the blade supply container 210 can be removed through the removal opening 212 of the blade supply container 210 and delivered into the blade supply container 210 by sliding the blade pusher 220 along the blade access slot 214 of the blade supply container 210, thus a user can load the blade 900 from the blade supply container 210 into the blade holder 100 without touching the blade 900 directly using hands, thereby improving safety of loading the blade 900.

In some embodiments, a plurality of blades 900 may be received in the blade supply container 210 and impinged upon with spring force by a spring means, the spring force may press the plurality of blades 900 so that the outermost one of the plurality of blades 900 may come to rest in a removal position next to the removal opening 212. It could be understood that, after the outermost one of the plurality of blades 900 is removed by sliding the blade pusher 220, another one of the plurality of blades 900 adjacent to the removed one may come to rest in the removal position next to the removal opening 212, that is, the next blade 900 to be removed is in this case always the outermost one of the plurality of blades 900.

In some embodiments, as illustrated in FIGS. 1 and 2, the blade load mechanism 200 may also include a first bracket 230, a first guide rail 240 fixedly connected to the first bracket 230 and a first slide block 250 slidable along the first guide rail 240. The blade pusher 220 may be fixedly connected to the first slide block 250, such that the first slide block 250 can be driven to slide along the first guide rail 240 to drive the blade pusher 220 to slide in the blade access slot 214, thereby achieving that the blade 900 can be pushed out of the blade supply container 210 through the removal opening 212. The user can slide the first slide block 250 along the first guide rail 240, so as to push the blade 900 out of the blade supply container 210. Therefore, a hand of the user can keep away from the blade 900 during movement of the blade 900, so as to avoid damage to the hand of the user and improve the safety.

In some embodiments, as illustrated in FIGS. 1 and 2, one of the first guide rail 240 and the first slide block 250 may be provided with a first dovetail slot 242, and the other of the first guide rail 240 and the first slide block 250 may be provided with a first flange 252 mating with the first dovetail slot 242, such that the first slide block 250 is able to stably slide along the first guide rail 240. For example, the first guide rail 240 may define the first dovetail slot 242, the first slide block 250 may be provide with the first flange 252, and the first flange 252 of the first slide block 250 can be fitted in the first dovetail slot 242 of the first guide rail 240, such that the first slide block 250 can be received in the first guide rail 240 and slide along the first guide rail 240. Certainly, in some other embodiments, the first slide block 250 may define the first dovetail slot 242 and the first guide rail 240 may be provided with the first flange 252, which is not specifically limited herein.

In some embodiments, as illustrated in FIGS. 1 and 2, an extending direction of the first guide rail 240 may be parallel to an extending direction of the blade access slot 214. Thus, the first slide block 250 and the blade pusher 220 can have the same moving stroke when pushing the blade 900 out of the blade supply container 210, and meanwhile the blade load mechanism 200 can have a simple and compact structure and is easy to manufacture.

In some embodiments, as illustrated in FIGS. 1 and 2, the blade load mechanism 200 may also include a first electric motor 260 having a first output shaft 262, a first gear 270 provided at an end of the first output shaft 262, and a first rack 280. The first electric motor 260 may be provided at one of the first slide block 250 and the first bracket 230, and the first rack 280 may be provided at the other of the first slide block 250 and the first bracket 230. The first gear 270 is able to mesh with the first rack 280. Thus, when the first electric motor 260 is energized, the first slide block 250 may be driven to slide along the first guide rail 240 secured to the first bracket 230, such that the sliding of the first slide block 250 can be motorized, thereby reducing labor burden of the user and saving operation time.

In some embodiments, the first guide rail 240 and the first bracket 230 may be formed into one piece. Therefore, the number of the parts of the blade load mechanism 200 can be reduced, and the structure of the blade load mechanism 200 can be simplified.

In some embodiments, as illustrated in FIGS. 1 and 2, the blade pusher 220 may be provided with a protrusion 222, and the blade 900 may define a recess 910, the protrusion 222 of the blade pusher 220 can be fitted in the recess 910 of the blade 900, such that the blade pusher 220 can engage with the blade 900, and push the blade 900 to remove from the blade supply container 210 under a driving force.

In some embodiments, as illustrated in FIGS. 1 and 2, the recess 910 may be defined at two ends of the blade 900 in a length direction of the blade 900. Thus, the protrusion 222 of the blade pusher 220 can be engaged in the recess 910 of the blade 900 at one end of the blade 900 away from the blade holder 100 in the length direction of the blade 900, and the blade pusher 220 can push the entire length of the blade 900 out of the blade supply container 210 without interfering with the blade holder 100.

In some embodiments, as illustrated in FIGS. 1 and 2, the first bracket 230 may include a first plate 232 and a second plate 234, the first plate 232 may be perpendicularly connected to a first end of the second plate 234, the first guide rail 240 and the first gear 270 may be fixedly connected to the two opposite sides of the first plate 232, and the first guide rail 240 may be arranged away from the second plate 234; the first rack 280 may be fixedly connected to a first side of the second plate 234, the blade supply container 210 may be detachably connected to a second side of the second plate 234 opposite the first side of the second plate 234; such that the first guide rail 240, the first rack 280 and the blade supply container 210 can be stably supported. It could be understood that, the blade supply container 210 may be detachably connected to the first rack 280, such that the blade supply container 210 may be replaced by another one after the plurality of blades 900 received in the blade supply container 210 are used up. Thus, convenience of the blade load mechanism 200 may be improved.

In some embodiments, as illustrated in FIGS. 1 and 2, the first bracket 230 may further include a third plate 236, the third plate 236 may perpendicularly connected to a second end of the second plate 234 opposite the first end of the second plate 234, the third plate 236 and the first plate 232 are located at two opposite sides of the second plate 234, the blade supply container 210 may be detachably connected to the second plate 234 and the third plate 236, such that the blade supply container 210 can be more stably supported.

In some embodiments, as illustrated in FIGS. 1 and 2, the blade load mechanism 200 may include a first connecting member 290 including a first connecting plate 292, a second connecting plate 294 and a third connecting plate 296, the first connecting plate 292 and the third connecting plate 296 may be perpendicularly connected to two ends of the second connecting plate 294, parallel to each other and located at the same side of the second connecting plate 294, the first connecting plate 292 may be fixedly connected to the first slide block 250, and the first electric motor 260 may be fixedly connected to the a side of the third plate 236 away from the first plate 232. Thus, the first electric motor 260 can be fixedly mounted to the first slide block 250 and can move along with the first slide block 250 when the first slide block 250 slides along the first guide rail 240.

In some embodiments, as illustrated in FIGS. 1 and 2, the third connecting plate 296 may have a low level than that of the first rack 280, the first output shaft 262 of the first electric motor 260 may pass through the third connecting plate 296 and extend into a space between the first plate 232 and the third plate 236, and the first gear 270 provided at the output end may mesh with the first rack 280. Thus, when the first electric motor 260 is energized, the first electric motor 260, the first connecting member 290 and the first slide block 250 can move as a single member.

Figure 3:
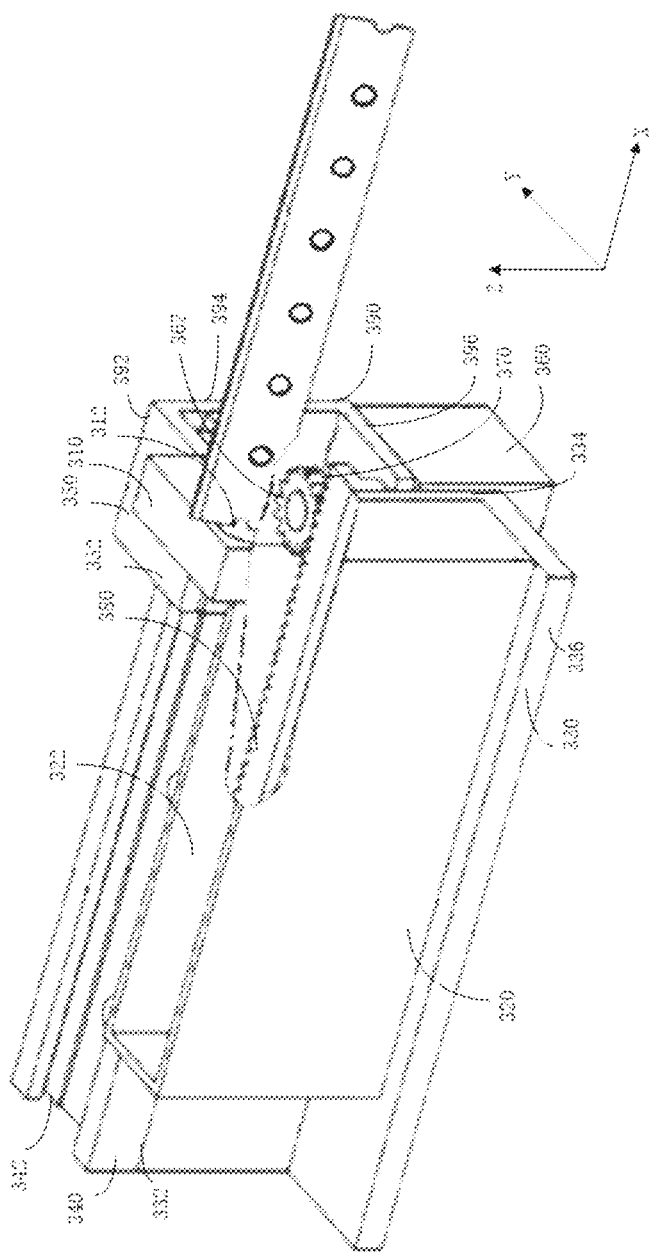
FIG. 3 is a perspective view of a blade unload mechanism according to an embodiment of the present disclosure.

According to some embodiments of the present disclosure, as illustrated in FIGS. 1 and 3, the blade unload mechanism 300 may include a blade attractor 310 and a blade disposal container 320, and the blade attractor 310 may be arranged above the blade disposal container 320. The blade attractor 310 may be configured to operatively attract an end of the blade 900 received in the blade receptacle 112 of the blade holder 100, and the blade attractor 310 may be moved away from the blade holder 100 under action of a driving force so as to pull the blade 900 out of the blade receptacle 112 of the blade holder 100. The blade disposal container 320 may define an receiving opening 322 at a top of the blade disposal container 320, and the blade disposal container 320 may be configured to receive the removed blade 900 through the receiving opening 322, such that when the entire length of the blade 900 is pulled out of the blade receptacle 112, the blade attractor 310 may operatively release the end of the blade 900, and the blade 900 will fall in the blade disposal container 320 under the action of gravity.

In some embodiments, as illustrated in FIGS. 1 and 3, the blade unload mechanism 300 may also include a second bracket 330, a second guide rail 340 fixedly connected to the second bracket 330 and a second slide block 350 slidable along the second guide rail 340. The blade attractor 310 may be fixedly connected to the second slide block 350, such that the second slide block 350 can be driven to slide along the second guide rail 340 to drive the blade attractor 310 to move in the extending direction of the receiving opening 322, thereby achieving that the blade 900 can be pulled out of the blade receptacle 112 of the base 110. The user can slide the second slide block 350 along the second guide rail 340, so as to pull the blade 900 out of the blade receptacle 112 of the base 110. Therefore, a hand of the user can keep away from the blade 900 during movement of the blade 900, so as to avoid damage to the hand of the user and improve the safety.

In some embodiments, as illustrated in FIGS. 1 and 3, one of the second guide rail 340 and the second slide block 350 may be provided with a second dovetail slot 342, and the other of the second guide rail 340 and the second slide block 350 may be provided with a second flange 352 mating with the second dovetail slot 342, such that the second slide block 350 is able to stably slide along the second guide rail 340. For example, the second guide rail 340 may define the second dovetail slot 342, the second slide block 350 may be provided with the second flange 352, and the second flange 352 of the second slide block 350 can be fitted in the second dovetail slot 342 of the second guide rail 340, such that the second slide block 350 can be received in the second guide rail 340 and slide along the second guide rail 340. Certainly, in some other embodiments, the second slide block 350 may define the second dovetail slot 342 and the second guide rail 340 may be provided with the second flange 352, which is not specifically limited herein.

In some embodiments, as illustrated in FIGS. 1 and 3, an extending direction of the second guide rail 340 may be parallel to an extending direction of the receiving opening 322 of the blade disposal container 320. Thus, the second slide block 350 and the blade attractor 310 can have the same moving stroke when pulling the blade 900 out of the blade receptacle 112 of the base 110, and meanwhile the blade unload mechanism 300 can have a simple and compact structure and is easy to manufacture.

In some embodiments, as illustrated in FIGS. 1 and 3, the blade unload mechanism 300 may also include a second electric motor 360 having a second output shaft 362, a second gear 370 provided at an end of the second output shaft 362, and a second rack 380. The second electric motor 360 may be provided at one of the second slide block 350 and the second bracket 330, and the second rack 380 may be provided at the other of the second slide block 350 and the second bracket 330. The second gear 370 is able to mesh with the second rack 380. Thus, when the second electric motor 360 is energized, the second slide block 350 may be driven to slide along the second guide rail 340 secured to the second bracket 330, such that the sliding of the second slide block 350 can be motorized, thereby reducing labor burden of the user.

In some embodiments, the second guide rail 340 and the second bracket 330 may be formed into one piece. Therefore, the number of the parts of the blade unload mechanism 300 can be reduced, and the structure of the blade unload mechanism 300 can be simplified.

In some embodiments, as illustrated in FIGS. 1 and 3, the blade attractor 310 may be provided with an electronic magnet 312. The electronic magnet 312 may be configured to attract and hold the blade on the blade attractor 310 when the electronic magnet 312 is energized, such that the blade attractor 310 pull the blade 900 out of the blade receptacle 112 of the base 110 under a driving force.

In some embodiments, as illustrated in FIGS. 1 and 3, the second slide block 350 may have a stroke in the extending direction of the receiving opening 322 of the blade disposal container 320 greater than or equal to the length of the blade 900, thereby ensuring that the whole blade 900 can be pulled out of the receptacle 112 of the base 110 by the blade attractor 310.

In some embodiments, as illustrated in FIGS. 1 and 3, the second bracket 330 may include a fourth plate 332 and a fifth plate 334, the fourth plate 332 may be perpendicularly connected to a first end of the fifth plate 334, the second guide rail 340 and the second gear 370 may be fixedly connected to the two opposite sides of the fourth plate 332, and the second guide rail 340 may be arranged away from the fifth plate 334; the second rack 380 may be fixedly connected to a first side of the fifth plate 334, the blade disposal container 320 may be detachably connected to a second side of the fifth plate 334 opposite the first side of the fifth plate 334; such that the second guide rail 340, the second rack 380 and the blade disposal container 320 can be stably supported.

In some embodiments, as illustrated in FIGS. 1 and 3, the second bracket 330 may further include a sixth plate 336, the sixth plate 336 may be perpendicularly connected to a second end of the fifth plate 334 opposite the first end of the fifth plate 334, the sixth plate 336 and the fourth plate 332 may be located at two opposite sides of the fifth plate 334, the blade disposal container 320 may be detachably connected to the fifth plate 334 and the sixth plate 336, such that the blade disposal container 320 can be more stably supported.

In some embodiments, as illustrated in FIGS. 1 and 3, the blade unload mechanism 300 may include a second connecting member 390 including a fourth connecting plate 392, a fifth connecting plate 394 and a sixth connecting plate 396, the fourth connecting plate 392 and the sixth connecting plate 396 may be perpendicularly connected to two ends of the fifth connecting plate 394, parallel to each other and located at the same side of the fifth connecting plate 394, the fourth connecting plate 392 may be fixedly connected to the second slide block 350, and the second electric motor 360 may be fixedly connected to the a side of the sixth connecting plate 396 away from the fourth connecting plate 392. Thus, the second electric motor 360 can be fixedly mounted to the second slide block 350 and can move along with the second slide block 350 when the second slide block 350 slides along the second guide rail 340.

In some embodiments, as illustrated in FIGS. 1 and 3, the sixth connecting plate 396 may have a low level than that of the second rack 380, the second output shaft 362 of the second electric motor 360 may pass through the sixth connecting plate 396 and extend into a space between the fourth connecting plate 392 and the sixth connecting plate 396, and the second gear 370 provided at the output end may mesh with the second rack 380. Thus, when the second electric motor 360 is energized, the second electric motor 360, the second connecting member 390 and the second slide block 350 can move as a single member.

A blade changing system 1000 according to a specific embodiment of the present disclosure will be describe in detail below with reference to FIGS. 1-3.

The blade changing system 1000 includes a blade holder 100, a blade load mechanism 200, and a blade unload mechanism 300.

The blade holder 100 has a base 110 defining a blade receptacle 112 configured to receive a blade 900, and a pressure plate 120 configured to releasably clamp the blade 900 received in the blade receptacle 112 on the base 110.

The blade load mechanism 200 and the blade unload mechanism 300 are provided at two opposite sides of the base 110 of the blade holder 100 in an extending direction the blade receptacle 112 of the base 110.

The blade load mechanism 200 includes a blade supply container 210, a blade pusher 220, a first bracket 230, a first guide rail 240, a first slide block 250, a first electric motor 260, a first gear 270, a first rack 280 and a connecting member 290.

The blade supply container 210 contains a plurality of blades 900 therein, and defines a removal opening 212 through which the blade 900 is able to be removed from the blade supply container 210, and a blade access slot 214 extending through an outer wall of the blade supply container 210 in a length direction of the blade 900 and through which the blade pusher 220 is able to engage with the blade 900.

The blade pusher 220 is configured to slide along the blade access slot 214 to push the blade 900 out of the blade supply container 210 through the removal opening 212, and deliver the blade 900 into the blade receptacle 112 of the base 110 of the blade holder 100.

The first bracket 230 is fixedly connected to a right side of the blade holder 100 in the extending direction of the blade receptacle 112.

The first guide rail 240 is fixedly connected to the first bracket 230 and the first slide block 250 is slidable along the first guide rail 240. The blade pusher 220 is fixedly connected to the first slide block 250, such that the first slide block 250 can be driven to slide along the first guide rail 240 to drive the blade pusher 220 to slide in the blade access slot 214, thereby achieving that the blade 900 can be pushed out of the blade supply container 210 through the removal opening 212.

The first guide rail 240 defines the first dovetail slot 242, the first slide block 250 is provide with the first flange 252, and the first flange 252 of the first slide block 250 can be fitted in the first dovetail slot 242 of the first guide rail 240, such that the first slide block 250 can be received in the first guide rail 240 and slide along the first guide rail 240.

An extending direction of the first guide rail 240 is parallel to an extending direction of the blade access slot 214, an extending direction of the blade access slot 214 is parallel to an extending direction of the blade receptacle 112 of the base 110, and the removal opening 212 is aligned with the blade receptacle 112.

The first electric motor 260 has a first output shaft 262, and the first gear 270 provided at an end of the first output shaft 262. The first electric motor 260 is provided the first slide block 250, and the first rack 280 is provided at the first bracket 230. The first gear 270 meshes with the first rack 280.

The blade pusher 220 is provided with a protrusion 222, and the blade 900 defines a recess 910 at two ends of the blade 900 in a length direction of the blade 900. Thus, the protrusion 222 of the blade pusher 220 can be engaged in the recess 910 of the blade 900 at one end of the blade 900 away from the blade holder 100 in the length direction of the blade 900.

The first bracket 230 includes a first plate 232, a second plate 234 and a third plate 236. The first plate 232 is perpendicularly connected to a first end of the second plate 234, the first guide rail 240 and the first gear 270 are fixedly connected to the two opposite sides of the first plate 232, and the first guide rail 240 is arranged away from the second plate 234; the first rack 280 is fixedly connected to a first side of the second plate 234, the blade supply container 210 is detachably connected to a second side of the second plate 234 opposite the first side of the second plate 234. The third plate 236 is perpendicularly connected to a second end of the second plate 234 opposite the first end of the second plate 234, the third plate 236 and the first plate 232 are located at two opposite sides of the second plate 234, the blade supply container 210 is detachably connected to the second plate 234 and the third plate 236.

The first connecting member 290 includes a first connecting plate 292, a second connecting plate 294 and a third connecting plate 296, the first connecting plate 292 and the third connecting plate 296 are perpendicularly connected to two ends of the second connecting plate 294, parallel to each other and located at the same side of the second connecting plate 294, the first connecting plate 292 is fixedly connected to the first slide block 250, and the first electric motor 260 is fixedly connected to the a side of the third plate 236 away from the first plate 232.

The third connecting plate 296 has a low level than that of the first rack 280, the first output shaft 262 of the first electric motor 260 may pass through the third connecting plate 296 and extend into a space between the first plate 232 and the third plate 236, and the first gear 270 provided at the output end meshes with the first rack 280.

The blade unload mechanism 300 includes a blade attractor 310 and a blade disposal container 320, a second bracket 330, a second guide rail 340, a second slide block 350, a second electric motor 360, a second gear 370, a second rack 380 and a second connecting member 390.

The blade attractor 310 is arranged above the blade disposal container 320. The blade attractor 310 is configured to operatively attract an end of the blade 900 received in the blade receptacle 112 of the blade holder 100, and the blade attractor 310 can be moved away from the blade holder 100 under action of a driving force so as to pull the blade 900 out of the blade receptacle 112 of the blade holder 100.

The blade disposal container 320 defines a receiving opening 322 at a top of the blade disposal container 320, and the blade disposal container 320 is configured to receive the removed blade 900 through the receiving opening 322.

The second bracket 330 is fixed connected to a left side of the blade holder 100 in the direction of the blade receptacle 112.

The second guide rail 340 is fixedly connected to the second bracket 330 and a second slide block 350 is slidable along the second guide rail 340. The blade attractor 310 is fixedly connected to the second slide block 350, such that the second slide block 350 can be driven to slide along the second guide rail 340 to drive the blade attractor 310 to move in the extending direction of the receiving opening 322.

The second guide rail 340 defines the second dovetail slot 342, the second slide block 350 is provided with the second flange 352, and the second flange 352 of the second slide block 350 can be fitted in the second dovetail slot 342 of the second guide rail 340.

An extending direction of the second guide rail 340 may be parallel to an extending direction of the receiving opening 322 of the blade disposal container 320, and the extending direction of the receiving opening 322 of the blade disposal container 320 is parallel to an extending direction of the blade receptacle 112 of the base 110.

The second electric motor 360 has a second output shaft 362, and the second gear 370 is provided at an end of the second output shaft 362. The second electric motor 360 is provided at the second slide block 350, and the second rack 380 is provided at the second bracket 330. The second gear 370 meshes with the second rack 380.

The blade attractor 310 is provided with an electronic magnet 312. The electronic magnet 312 is configured to attract and hold the blade on the blade attractor 310 when the electronic magnet 312 is energized.

The second bracket 330 includes a fourth plate 332, a fifth plate 334 and a sixth plate 336. The fourth plate 332 is perpendicularly connected to a first end of the fifth plate 334, the second guide rail 340 and the second gear 370 are fixedly connected to the two opposite sides of the fourth plate 332, and the second guide rail 340 is arranged away from the fifth plate 334; the second rack 380 is fixedly connected to a first side of the fifth plate 334, the blade disposal container 320 is detachably connected to a second side of the fifth plate 334 opposite the first side of the fifth plate 334. The sixth plate 336 is perpendicularly connected to a second end of the fifth plate 334 opposite the first end of the fifth plate 334, the sixth plate 336 and the fourth plate 332 are located at two opposite sides of the fifth plate 334, the blade disposal container 320 is detachably connected to the fifth plate 334 and the sixth plate 336.

The second connecting member 390 includes a fourth connecting plate 392, a fifth connecting plate 394 and a sixth connecting plate 396, the fourth connecting plate 392 and the sixth connecting plate 396 are perpendicularly connected to two ends of the fifth connecting plate 394, parallel to each other and located at the same side of the fifth connecting plate 394, the fourth connecting plate 392 is fixedly connected to the second slide block 350, and the second electric motor 360 is fixedly connected to the a side of the sixth connecting plate 396 away from the fourth connecting plate 392.

The sixth connecting plate 396 has a low level than that of the second rack 380, the second output shaft 362 of the second electric motor 360 passes through the sixth connecting plate 396 and extend into a space between the fourth connecting plate 392 and the sixth connecting plate 396, and the second gear 370 provided at the output end meshes with the second rack 380.

An operation process of the blade changing system will be briefly described below.

When loading a blade 900, the first electric motor 260 is energized to rotate to drive the first slide block 250 to slide on the first guide rail 240 towards the blade holder 100, such that the blade pusher 220 engaged with the blade 900 received in the blade supply container 230 at one end of the blade 900 away from the blade holder 100 is driven to push the blade 900 out of the blade supply container 230 and deliver the blade 900 into the blade receptacle 112 of the base 110 of the blade holder 100. Then, the first electric motor 260 is energized to rotate reversely to drive the first slide block 250 to slide on the first guide rail 240 away from the blade holder 100, so as to engage with another blade 900 received in the blade supply container 230 at one end of the another blade 900 away from the blade holder 100.

When unloading a blade 900, the blade attractor 310 is energized to attract and hold an end of the blade 900 received in the blade receptacle 112 of the base 110, and the second electric motor 360 is energized to rotate to drive the second slide block 350 to slide on the second guide rail 340 away from the blade holder 100, such that the blade attractor 310 holding the blade 900 is driven to pull the blade 900 out of the blade receptacle 112. The blade attractor 310 is de-energized when the entire length of the blade 900 is out of the blade receptacle 112, and the blade 900 falls in the blade disposal container 320 through the receiving opening 322. Then, the second electric motor 360 is energized to rotate reversely to drive the second slide block 350 to slide on the second guide rail 340 towards the blade holder 100, so as to be located adjacent to the blade holder 100 for preparation of attracting the next blade 900 received in the blade receptacle 112.

In the blade changing system 1000 according to the specific embodiment of the present disclosure, by providing the blade load mechanism 200 and the blade unload mechanism 300 at two opposite sides of the blade holder 100, the blade 900 can be loaded and unloaded automatically, rapidly and safely.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A blade changing system for a blade holder of a microtome, the blade holder having a base defining a blade receptacle configured to receive a blade, the blade changing system comprising:
   a blade load mechanism positioned on a first side of the blade holder, the blade load mechanism including:
      a blade supply container configured to contain a blade therein, the blade supply container defining a removal opening through which the blade is able to be removed from the blade supply container, and a blade access slot through an outer wall of the blade supply container in a length direction of the blade; and
      a blade pusher configured to engage with the blade through the blade access slot and slide along the blade access slot to push the blade out of the blade supply container through the removal opening, and deliver the blade into the blade receptacle of the base of the blade holder; and
   a blade unload mechanism positioned on a second side of the blade holder that is opposite of the first side, the blade unload mechanism including;
      a blade attractor configured to operatively attract an end of the blade received in the blade receptacle of the blade holder; and
      a blade disposal container defining a receiving opening at a top of the blade disposal container,
      wherein the blade attractor is arranged above the blade disposal container and configured to be able to move in an extending direction of the receiving opening under the action of a driving force so as to pull the blade out of the blade receptacle of the blade holder, and the blade disposal container is configured to receive the removed blade through the receiving opening,
   wherein the blade load mechanism is configured to load a blade into the blade receptacle of the base of the blade holder, and the blade unload mechanism is configured to unload a blade from the blade receptacle of the base of the blade holder.

2. The blade changing system according to claim 1, wherein the blade load mechanism further comprises:
   a first bracket;
   a first guide rail fixedly connected to the first bracket; and
   a first slide block slidable along the first guide rail,
   wherein the blade pusher is fixedly connected to the first slide block, such that the first slide block is able to be driven to slide along the first guide rail to drive the blade pusher to slide in the blade access slot.

3. The blade changing system according to claim 2, wherein one of the first guide rail and the first slide block is provided with a first dovetail slot, and the other of the first guide rail and the first slide block is provided with a first flange mating with the first dovetail slot.

4. The blade changing system according to claim 2, wherein an extending direction of the first guide rail is parallel to an extending direction of the blade access slot.

5. The blade changing system according to claim 2, further comprising:
   a first electric motor having an output shaft and provided at one of the first slide block and the first bracket;
   a first gear provided at an end of the output shaft; and
   a first rack provided at the other of the first slide block and the first bracket and capable of meshing with the first gear.

6. The blade changing system according to claim 2, wherein the first guide rail and the first bracket are formed into one piece.

7. The blade changing system according to claim 5, wherein the first bracket comprises a first plate and a second plate, the first plate is perpendicularly connected to a first end of the second plate, the first guide rail and the first gear are fixedly connected to the two opposite sides of the first plate, and the first guide rail is arranged away from the second plate; the first rack is fixedly connected to a first side of the second plate, the blade supply container is detachably connected to a second side of the second plate opposite the first side of the second plate; and wherein the first bracket further comprises a third plate, the third plate is perpendicularly connected to a second end of the second plate opposite the first end of the second plate, the third plate and the first plate are located at two opposite sides of the second plate, the blade supply container is detachably connected to the second plate and the third plate.

8. The blade changing system according to claim 7 further comprising a first connecting member comprising a first connecting plate, a second connecting plate and a third connecting plate, wherein the first connecting plate and the third connecting plate are perpendicularly connected to two ends of the second connecting plate, parallel to each other and located at the same side of the second connecting plate, the first connecting plate is fixedly connected to the first slide block, and the first electric motor is fixedly connected to the a side of the third plate away from the first plate.

9. The blade changing system according to claim 8, wherein the third connecting plate has a low level than that of the first rack, the output shaft of the first electric motor passes through the third connecting plate and extends into a space between the first plate and the third plate, and the first gear provided at the output end meshes with the first rack.

10. The blade changing system according to claim 1, wherein the blade pusher is provided with a protrusion, and the blade defines a recess, the protrusion of the blade pusher is able to be fitted in the recess of the blade.

11. The blade changing system according to claim 10, wherein the recess is defined at two ends of the blade in the length direction of the blade.

12. A blade unload mechanism for a blade holder of a microtome, the blade holder having a base defining a blade receptacle configured to receive a blade, the blade unload mechanism comprising:
   a blade attractor configured to operatively attract an end of the blade received in the blade receptacle of the blade holder; and
   a blade disposal container defining an receiving opening at a top of the blade disposal container,
   wherein the blade attractor is arranged above the blade disposal container and configured to be able to move in an extending direction of the receiving opening under the action of a driving force so as to pull the blade out of the blade receptacle of the blade holder, and the blade disposal container is configured to receive the removed blade through the receiving opening.

13. The blade unload mechanism according to claim 12, further comprising:
   a second bracket,
   a second guide rail fixedly connected to the second bracket, and
   a second slide block slidable along the second guide rail, wherein the blade attractor is fixedly connected to the second slide block, and the second slide block is configured to be driven to slide along the second guide rail to drive the blade attractor to move in the extending direction of the receiving opening.

14. The blade unload mechanism according to claim 13, wherein one of the second guide rail and the second slide block is provided with a second dovetail slot, and the other of the second guide rail and the second slide block is provided with a second flange mating with the second dovetail slot.

15. The blade unload mechanism according to claim 13, wherein an extending direction of the second guide rail is parallel to an extending direction of the receiving opening of the blade disposal container.

16. The blade unload mechanism according to claim 13, further comprising:
   a second electric motor having an output shaft and provided at one of the second slide block and the second bracket;
   a second gear providing at an end of the output shaft; and
   a second rack provided at the other of the second slide block and the second bracket and capable of meshing with the second rack.

17. The blade unload mechanism according to claim 12, wherein the blade attractor is provided with an electronic magnet, the electronic magnet is configured to attract and hold the blade on the blade attractor when the electronic magnet is energized.

18. The blade unload mechanism according to claim 13, wherein the second slide block has a stroke in the extending direction of the receiving opening of the blade disposal container greater than or equal to the length of the blade.

19. A blade load mechanism for a blade holder of a microtome, the blade holder having a base defining a blade receptacle configured to receive a blade, the blade load mechanism comprising:
   a blade supply container configured to contain a blade therein, the blade supply container defining a removal opening through which the blade is able to be removed from the blade supply container, and a blade access slot through an outer wall of the blade supply container in a length direction of the blade;
   a blade pusher configured to engage with the blade through the blade access slot and slide along the blade access slot to push the blade out of the blade supply container through the removal opening, and deliver the blade into the blade receptacle of the base of the blade holder;
   a first bracket;
   a first guide rail fixedly connected to the first bracket;
   a first slide block slidable along the first guide rail, wherein the blade pusher is fixedly connected to the first slide block, such that the first slide block is able to be driven to slide along the first guide rail to drive the blade pusher to slide in the blade access slot;
   a first electric motor having an output shaft and provided at one of the first slide block and the first bracket;
   a first gear provided at an end of the output shaft; and
   a first rack provided at the other of the first slide block and the first bracket and capable of meshing with the first gear;
wherein the first bracket comprises a first plate and a second plate, the first plate is perpendicularly connected to a first end of the second plate, the first guide rail and the first gear are fixedly connected to the two opposite sides of the first plate, and the first guide rail is arranged away from the second plate; the first rack is fixedly connected to a first side of the second plate, the blade supply container is detachably connected to a second side of the second plate opposite the first side of the second plate.

* * * * *